S. J. POYNER.
SPRING WHEEL.
APPLICATION FILED SEPT. 3, 1912.

1,074,290.

Patented Sept. 30, 1913.

2 SHEETS—SHEET 1.

S. J. POYNER.
SPRING WHEEL.
APPLICATION FILED SEPT. 3, 1912.

1,074,290.

Patented Sept. 30, 1913.

2 SHEETS—SHEET 2.

UNITED STATES PATENT OFFICE.

SAMUEL JAMES POYNER, OF PIERSON, MANITOBA, CANADA.

SPRING-WHEEL.

1,074,290.  Specification of Letters Patent.  Patented Sept. 30, 1913.

Application filed September 3, 1912. Serial No. 718,410.

*To all whom it may concern:*

Be it known that I, SAMUEL JAMES POYNER, of the village of Pierson, in the Province of Manitoba, Canada, have invented certain new and useful Improvements in Spring-Wheels, of which the following is the specification.

The invention relates to an improvement in spring wheels particularly adapted for use in automobiles and other such like vehicles and the object of the invention is to provide, an inexpensive, durable and efficient wheel of this class having the parts constructed so that they can be readily removed for repair or other such purposes.

It consists essentially in a central hub supplied with radiating pockets, extending spring members releasably secured within the pockets and fitted at their outer ends with flanges, shoes secured to the springs and a tire carried by the shoes and springs, the parts being arranged and constructed as hereinafter more particularly described.

Figure 1:
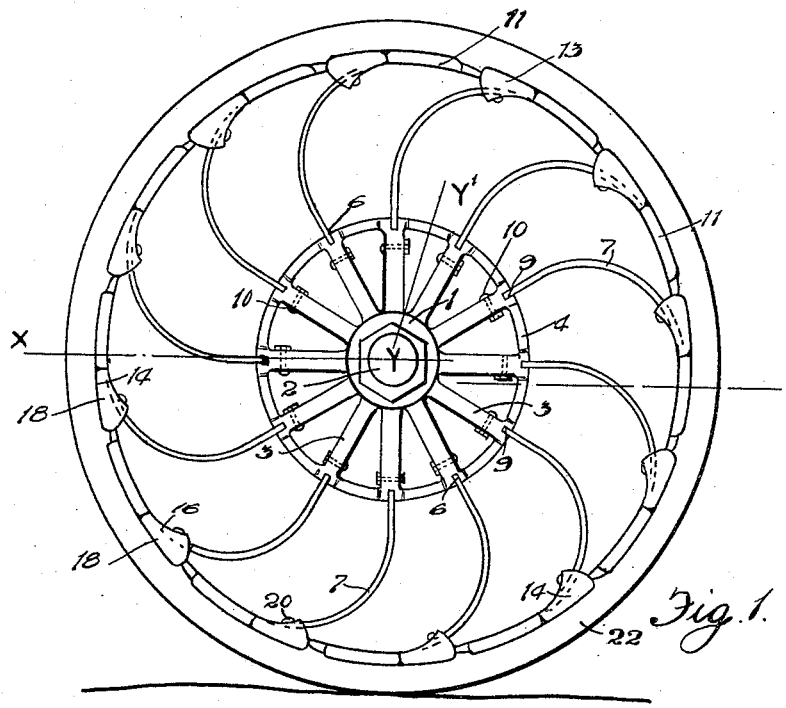
Figure 2:
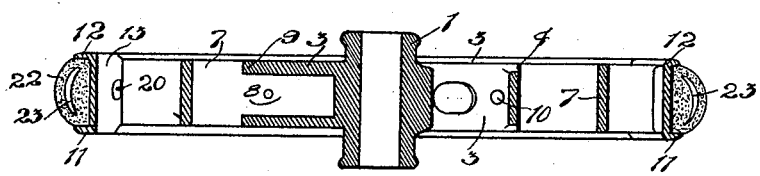
Figure 3:
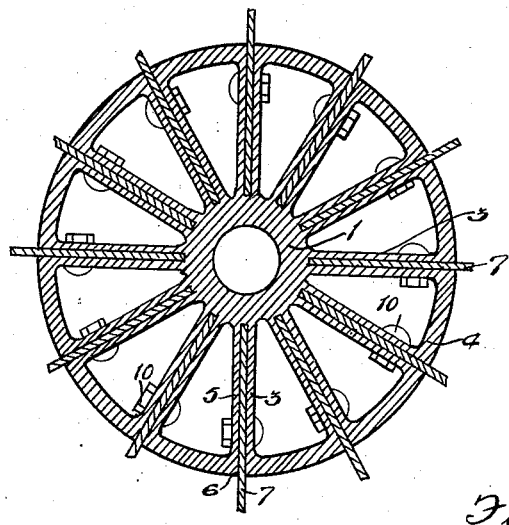
Figure 4:
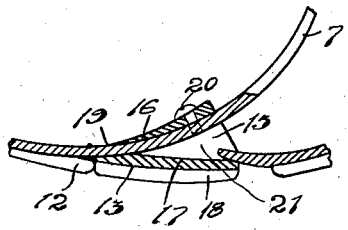
Figure 5:
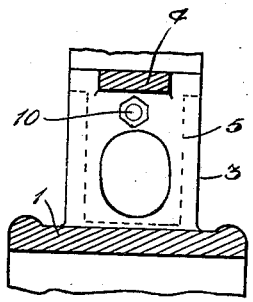

Figure 1 is a side view of my wheel. Fig. 2 is a longitudinal sectional view through the same, the section being taken in the plane denoted by the line X—X' Fig. 1. Fig. 3 is a vertical sectional view through the hub. Fig. 4 is an enlarged detailed vertical sectional view through one of the shoes and a portion of one of the springs. Fig. 5 is a vertical sectional view through a portion of the hub, the section being taken in the plane denoted by the line Y—Y' Fig. 1.

In the drawings like characters of reference indicate corresponding parts in each figure.

1 represents the hub of the wheel adapted to be mounted on the ordinary axle 2 of an automobile or other such vehicle. The hub is formed with radiating members 3 having their outer ends connected by a common encircling band 4. The members 3 are fitted with more or less rectangular pockets 5 having their outer ends opening to cross slots 6 formed in the band. The hub, radiating portion and band can all be cast in one piece as will readily be understood, the pockets and cross slots being reserved in the casting when it is being formed.

7 are flat springs having their inner ends 8 contracted and passing into the pockets there being shoulders formed at 9 which bear on the cross slots 6. The inner ends of the springs are retained in the pockets by bolts 10. The body portions of the springs are bent in the shape best shown in Fig. 1 and have opposing flanges 11 and 12 retained thereon toward the outer ends the purpose of which will be more apparent as the description proceeds.

13 are shoes formed each from a casting having side walls 15 and 16 connected in each instance by two spaced converging webs 16 and 17, it being noticed that the side walls extend beyond the web 17 to form flanges 18 similar to those 11 supplied on the springs and further that an opening is reserved at 19 in each casting to admit the springs. The shoes are placed on the springs adjoining the flanges 11 and 12 and are held permanently thereon by screws or bolts 20. The extremities of the springs are housed within the openings located at 21 in the shoes.

23 is a tire formed from rubber or other similar flexible material which tire encircles the springs and has the inner face thereof passing between the flanges 11 and 12 of the springs and those 14 and 15 of the shoes. The tire has a crescent shaped hollow interior as indicated at 23.

It will be seen that when a wheel such as mine is used that the springs will collapse and take up all jars as satisfactorily as the ordinary pneumatic tire and further that no difficulty is experienced through puncturing as is common in the latter form of tire.

What I claim as my invention is;—

The combination comprising a hub having radiating members connected by an encircling band, the members being fitted with radiating pockets and the band with cross slots opening to the pockets, flat springs having their inner ends contracted and passing into the pockets and forming shoulders received within the slots and the body portions thereof extending and bent, the outer ends thereof presenting outwardly directed opposing pairs of flanges, releasable bolts retaining the springs within the pockets, shoes secured to the springs and adjoining the inner ends of the flanges thereon, said shoes being fitted with opposing pairs of flanges similar to those on the springs and having recesses formed therein designed to receive the extremities of the springs and an encircling tire bearing on the springs and shoes and prevented from lateral displacement thereon by the flanges.

Signed at Melita, Man., this 23rd day of April 1912.

SAMUEL JAMES POYNER.

In the presence of—
MARGARET S. REID,
D. WILL. YUILL.

Copies of this patent may be obtained for five cents each, by addressing the "Commissioner of Patents, Washington, D. C."